United States Patent [19]

Boyle et al.

[11] 3,796,927

[45] Mar. 12, 1974

[54] THREE DIMENSIONAL CHARGE COUPLED DEVICES

[75] Inventors: Willard Sterling Boyle, Summit; George Elwood Smith, Murray Hill, both of N.J.

[73] Assignee: Bell Telephone Laboratories, Incorporated, Murray Hill, Berkeley Heights, N.J.

[22] Filed: Dec. 16, 1970

[21] Appl. No.: 98,619

[52] U.S. Cl. .......................... 317/235 R, 317/235 G

[51] Int. Cl. .......................................... H011 11/14

[58] Field of Search ......... 317/235; 307/238, 220 C, 307/1, 22 GC, 307; 340/173 CA

[56] References Cited

UNITED STATES PATENTS

| | | | |
|---|---|---|---|
| 3,676,715 | 7/1972 | Brojdo | 317/235 |
| 3,621,279 | 11/1971 | Jen et al. | 317/235 |
| 3,621,283 | 11/1971 | Teer et al. | 317/235 |
| 3,623,026 | 11/1971 | Engeler | 317/235 |
| 3,648,131 | 3/1972 | Stuby | 317/235 |
| 3,407,341 | 10/1968 | Franks | 317/235 |
| 3,564,355 | 2/1971 | Lehovec | 317/235 |

OTHER PUBLICATIONS

Electronics, "Overlap Key to G.E.'s Charge-Coupled Device" pages 33, 34, Nov. 9, 1970.

*Primary Examiner*—Jerry D. Craig
*Attorney, Agent, or Firm*—P. V. D. Wilde

[57] ABSTRACT

The specification describes a new class of semiconductor devices in which the charge is controllably translated in three dimensions. Translation control circuits can be disposed on both sides of the usual semiconductor wafer giving a new dimension in the design of logic and memory devices. In the exemplary specific embodiment the concept is described in connection with a shift register. Extension to logic circuits, e.g., to perform crossover and fan-in functions, is straightforward.

10 Claims, 10 Drawing Figures

INVENTORS W. S. BOYLE
G. E. SMITH
BY

ATTORNEY

THREE DIMENSIONAL CHARGE COUPLED DEVICES

This invention relates to charge coupled devices.

A new class of solid state information storage devices has recently been discovered which is based upon the phenomenon of storage and transfer of charge while wholly contained within a storage medium, with means for identifying the presence, absence or amount of charge at selected sites. These devices have become known generically as charge coupled devices and fundamental versions of these devices are described and claimed in United States application Ser. No. 11,541, filed for W. S. Boyle and G. E. Smith on Feb. 16, 1970. Alternative charge coupled devices are described in United States application Ser. No. 11,448, filed for D. Kahng and E. H. Nicollian on Feb. 16, 1970 now U.S. Pat. No. 3,651,349. In all the embodiments of these devices known to date, the charge entities, representing the information, were stored and processed in a thin storage medium with a two dimensional array of drive elements so that the controlled movement of charge was essentially two dimensional.

According to the present invention, substantial advantages can be obtained by providing a third dimension of control, i.e., through the thickness of the medium. Charge can be controllably transferred in the thickness dimension with control elements suitably disposed on opposite sides of a thin storage element. This expedient extends the versatility of these devices for many applications but it is especially significant as applied to logic circuits. For example complex logic circuits can be formed on both sides of a thin semiconductor and interaction between these circuits can be made to occur wherever desired. One principal advantage is the ease with which a flow of information on one side can be made to "cross over" a flow of information on the other side without interacting. This also allows for a higher packing density for logic circuits and therefore more efficient utilization of the semiconductor. As an added benefit, more complex circuit designs become possible.

Advantages of three dimensional transfer also accrue in fundamental device structures such as the shift register. Application of the invention to a shift register is significant in the sense that this device can be considered as a basic building block from which many forms of signal processing and storage devices can be built.

In the processing of high density charge coupled devices, it is often desirable to fabricate the entire array with a simple monolithic pattern of electrodes using a single drive configuration along one dimension of the array. Once this limitation is imposed, the charge translation is essentially unidirectional. This condition is acceptable for a one dimensional shift register or if any parallel channels are operated in one integrated chip. However, a single shift register in which the information is serpentined in a square or rectangular chip is awkward to fabricate.

This invention provides a solution to this problem since the charge can be translated unidirectionally on one side of the slice but then be transferred to the other side of the slice for transfer in the reverse or some other direction. A single set of drive elements are employed on each side of the chip. These drive elements can be made to interconnect to a single drive source.

Transfer of charge between storage sites on opposite sides of the charge storage element can be achieved by forward biasing a storage site and injecting its information into the bulk while simultaneously reverse biasing the contiguous storage site on the obverse side of the medium. The carriers (or absence of carriers) will diffuse to the depletion region of the reverse biased site. The diffusion time will depend on the thickness of the storage medium. The thickness can be effectively reduced by biasing the receiving site so that its depletion region extends substantially into the bulk.

These and other aspects of the invention may be more easily understood with the aid of the following detailed description. In the drawings:

FIG. 1D also shows, schematically, the transfer of stored charge between storage sites on opposite sides of a storage medium;

Figure 1A:
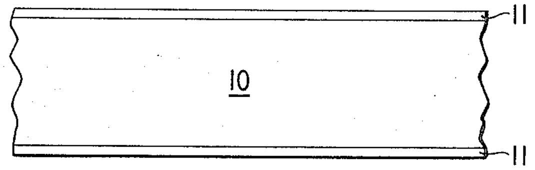
FIGS. 1A to 1D are sectional views of a semiconductor wafer during various stages of exemplary processing appropriate for the formation of a device functioning according to the invention.
Figure 1B:
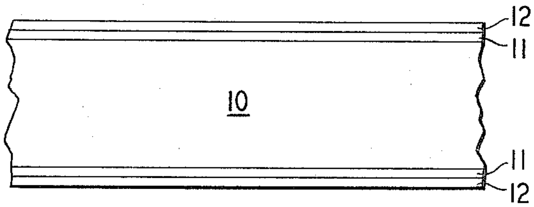
Figure 1C:
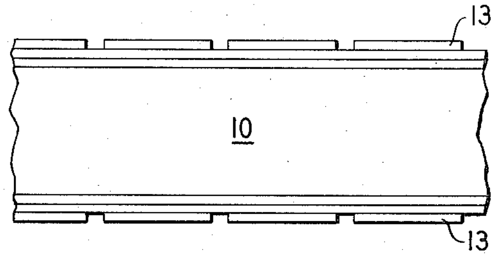
Figure 1D:
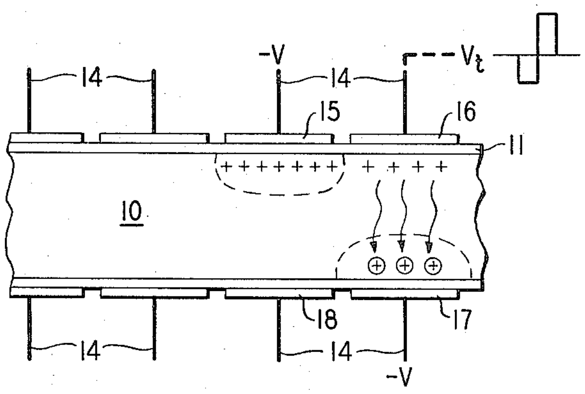

FIG. 1 illustrates the basic design concept of the invention, i.e., the utilization of charge storage sites on both sides of a storage medium with means for transferring charge from one side to another. Using the familiar silicon technology for a specific example, an n-silicon wafer 10 is shown in FIG. 1A having an oxide layer 11 on both sides thereof. The silicon wafer is 10ωcm, and 25μ thick. FIG. 1B shows the oxidized wafer with metallized layers 12. The metal may be any appropriate contact material, such as Au, Al, Ni, W, Ti, Zr or even Si. The wafer is masked with a standard photoresist 13, FIG. 1C, in the electrode pattern desired and then etched by wellknown methods to form the structure of FIG. 1D. Several alternatives for making this structure are known to those skilled in the art, and this aspect is not critical to the invention. Leads 14 are attached to the electrodes and are powered by a three wire sequential drive voltage as explained in detail in the copending applications referred to above.

The transfer of charge between storage sites on opposite sides of wafer 10 will be explained by reference to electrodes 15, 16, 17 and their associated storage sites. Charge, in the form of minority carriers, is shown stored at a desired point of a conventional line sequence. Electrode 16 is initially biased negatively, in sequence to the bias on electrode 15, to transfer the charge to its storage region. After a half-cycle of negative bias the voltage is made more positive or sufficient to inject the stored carriers into the bulk of medium 10. The transfer bias is shown by the schematic waveform designated $V_t$. The positive portion of the cycle may be greater or smaller as desired and the duration may require adjustment to fit individual applications. Electrode 17 is biased with the normal transfer bias, −V, in sequence. Charge will be trapped temporarily in the depletion region adjacent electrode 17 until transferred in the normal sequence to the storage site adjacent electrode 18.

Although the transfer mechanim is described above with reference to a specific device, it will be appreciated that various departures can be made while still taking advantage of the general concept of the invention. For example, other storage media and insulators can be used. Alternative drive schemes are appropriate for transferring the charge. In moving charge through the thickness of the wafer, simultaneous lateral movement may be advantageous, especially if the wafer is made very thin.

Figure 2:
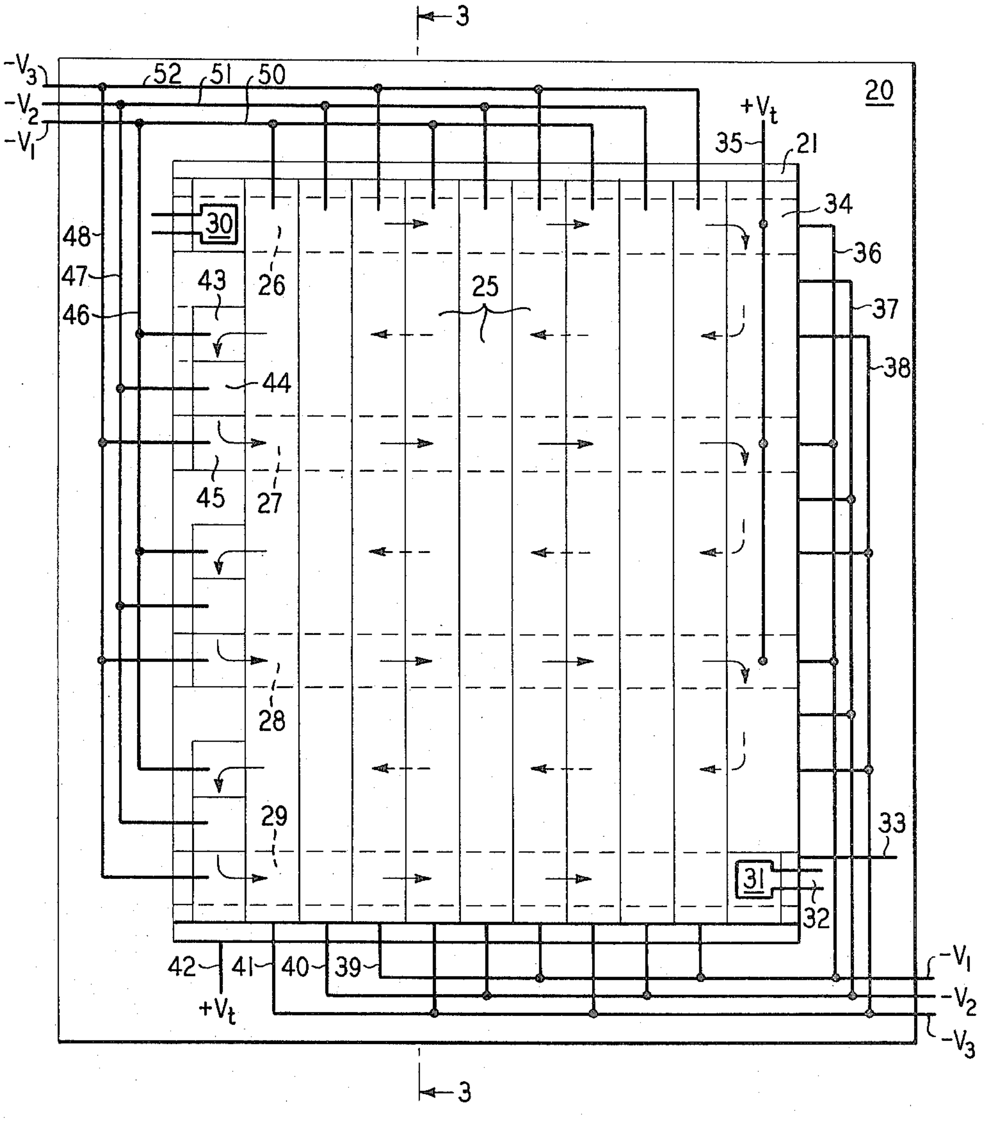
FIG. 2 is a plan view, partly schematic, of an exemplary shift register operating according to the invention.
Figure 3:
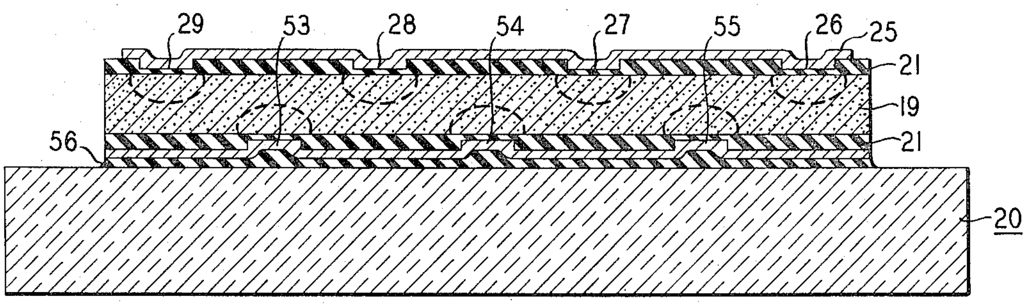
FIG. 3 is a sectional view along a—a of FIG. 2 showing the lateral isolation between the longitudinal channels of the device of FIG. 2.
Figure 4:
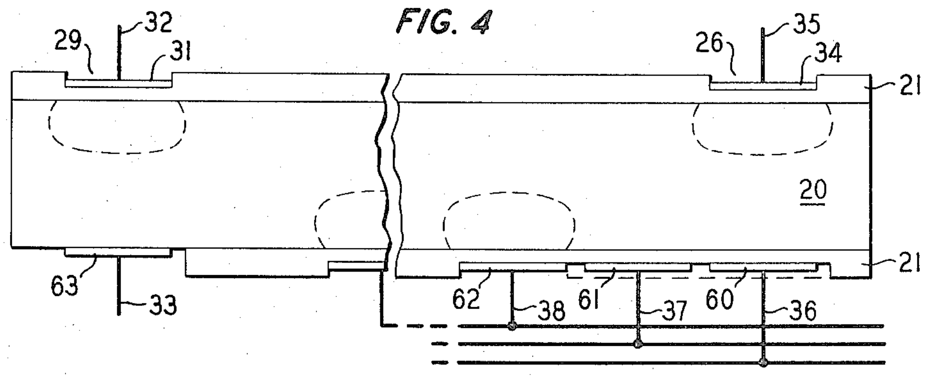
FIG. 4 is an end view of the device of FIG. 2 showing in greater detail the transfer stage used to shift charge laterally between channels.

The following description, in connection with FIGS. 2–4, is of one exemplary device showing some practical implications of the invention. The device is basically a shift register having, arbitrarily, 21 bits. Certain conditions on such a device are imposed by processing limitations and these aid in the appreciation of the invnetion. For example, for optimum economy and efficiency of operation, the electrodes at the various storage sites should be small and closely packed. This limits the chip area allowed for access circuitry. The use of bidirectional information transfer in a single channel charge coupled shift register is not at all straight forward because the inherent directionality necessary for the charge coupled transfer mechanism precludes the normal operation of two lines in different directions. It is therefore difficult to "serpentine" the channel in the semiconductor slice without resorting to complex circuit patterns and multiple crossovers.

The shift register of FIG. 2 largely overcomes these problems. The silicon chip 19 is mounted on a ceramic support 20. The silicon wafer is oxidized on both sides to form oxide layers 21, only one of which is partially visible in the FIG. 2. Th oxide is formed with thinned channels extending longitudinally on both sides of the wafer (FIG. 3). The plan view of FIG. 2 shows the location of electrodes and the transfer of charge within the wafer. For a complete understanding, especially of the form of the longitudinal channels and the transport of charge in the thickness dimensions, reference to FIGS. 1, 3, and 4 will be helpful.

An array of electrode strips 25 are shown covering the surfaces 21 of the oxide layer of the wafer. The electrode strips are closely spaced and define the lateral, i.e., right and left, boundaries of each charge storage location. The other boundaries of the storage sites are fixed by the longitudinally extending channels in the oxide layer. The channels on the exposed side of the wafer appear at 26, 27, 28, and 29. The channels on the obverse side of the wafer are not apparent in this figure but are located between the channels just described. An input stage is shown at 30 and an output stage at 31. In this example, both will be described for simplicity as MOS devices, the input stage being driven to avalanche for injection of minority carriers and the output stage forward biased by lead 32 with ohmic connection 33 for detection. The latter functions in a manner similar to the mechanism of FIG. 1D. The former mechanism is well known. Reference is made to the copending applications referred to above for various alternatives useful for these stages.

The operation of the device is essentially as follows.

Information in the form of minority charge carriers (or the absence thereof) is generated at the input location 30 and translated by the three phase drive system, $-V_1$, $-V_2$, and $-V_3$, represented by drive wires 50, 51, and 52 along channel 26 as indicated by the arrows. On reaching the storage site adjacent electrode 34, that site is forward biased by drive connection 35 in the manner shown in FIG. 1D, with electrode 16 of that figure corresponding to electrode 34 of FIG. 2. The charge is thereby transferred to the obverse side of the storage medium. The charge is moved laterally to the next longitudinal channel by the three-wire drive arrangement represented by wires 36, 37, and 38, although the electrodes are not visible. The translation of charge on the obverse side of the slice is designated by the dashed arrows. The sequential transfer of charge down the hidden channels is controlled by the three-wire drive arrangement indicated by wires 39, 40, and 41 in the same way as that shown on the exposed side. Upon reaching the terminal stage of the channel the charge is injected, via positive bias on 42, to the storage site adjacent electrode 43 on the visible surface of the wafer and translated laterally to sites indicated at 44 and 45 by the three-wire drive represented by wires 46, 47, and 48. The charge then traverses channel 27 and, in the manner just described, through the remaining path to output stage 31.

The arrangement of the longitudinal channels and the cross section of the device (at a—a of FIG. 2) are evident from FIG. 3. The longitudinal channels on the exposed side of FIG. 2 appear at 26, 27, 28, and 29. Channels 53, 54, and 55, on the obverse side of the storage medium, are hidden in FIG. 2. The wafer is affixed to the ceramic support 20 by bonding layer 56 (which may be epoxy or other appropriate insulating adhesive).

The lateral translating elements are shown in FIG. 4 which is a partial right end view of FIG. 2. All numbered elements appear in FIG. 2 with the exception of lateral translating electrodes 60, 61, and 62 and output ohmic electrode 63.

Figure 5:
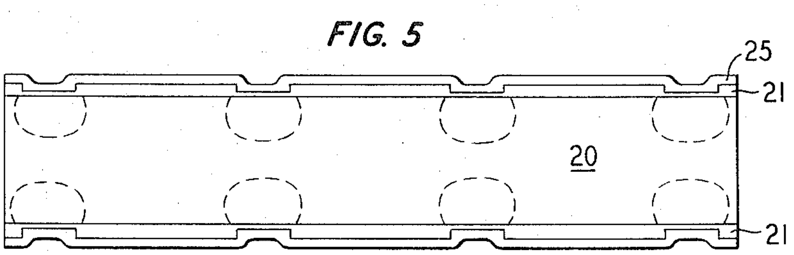
FIG. 5 is a sectional view similar to that of FIG. 3 showing an alternative arrangement.

If the wafer 20 is made sufficiently thick (or alternatively if the depleted regions are shallow enough) so that isolation occurs between channels aligned across the thickness of the wafer, the channel capacity may be increased. Such an arrangement is illustrated in FIG. 5 which corresponds essentially to the sectional view of FIG. 3. However, if the thickness of the medium is large compared with the lateral spacing between adjacent channels, then lateral diffusion during the transfer of charge through the slice may become a problem. This consideration suggests that the medium should be thin. Other methods for achieving isolation between channels to allow closer spacing will occur to those skilled in the art. For example, *n*+ or p-type impurities can be implanted or diffused between the channels. It should be pointed out that it is not necessary for the depleted regions adjacent to isolated sites be isolated. These regions may overlap or indeed the entire medium may be operated in a depleted condition without transfer of charge through the slice. For example, in a 10 ohm cm. silicon slice having a thickness of 20 microns, a ten volt bias on each side of the slice will essentially deplete the semiconductor through the thickness of the slice. These are, however, reasonable operating parameters for devices operating according to the invention. Transfer through the slice, as pointed out before, is preferably achieved with a significant potential difference between the sites. For example, a positive bias on the transfer site and a large negative bias on the receiving site. Transfer is also possible with a large negative bias on the receiving site and a small negative bias, or no bias, on the transfer site.

Figure 6:
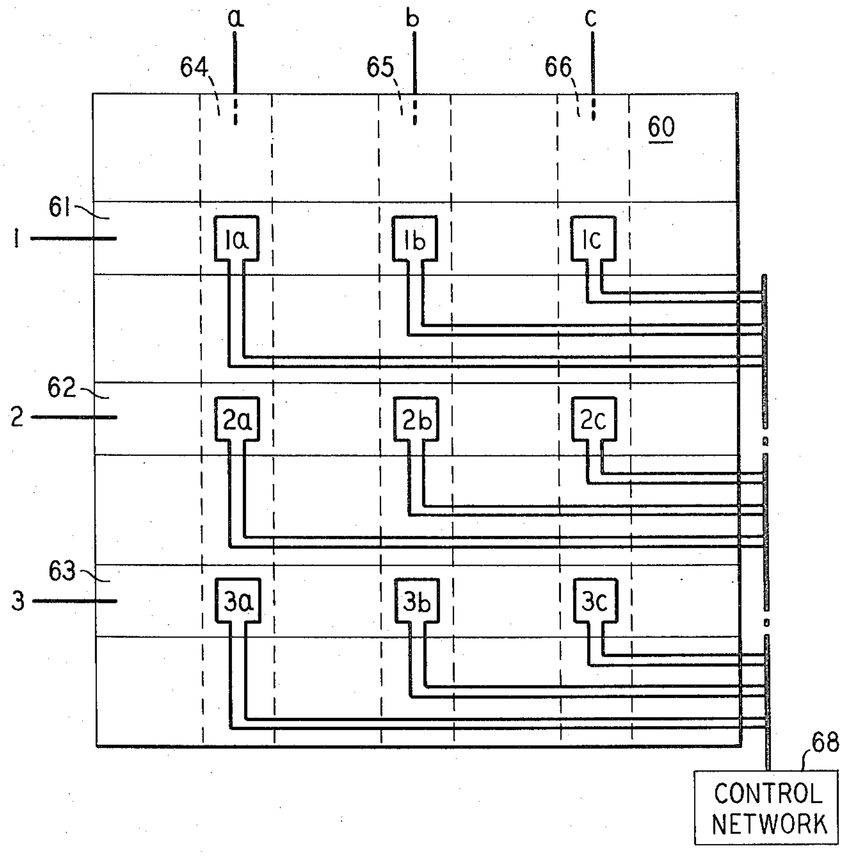
FIG. 6 is a plan view of a crosspoint switching device embodying the principles of the invention.

Another embodiment of the invention in which concept of the invention is applied to a switching matrix is shown in FIG. 6. The device shown is a crosspoint switch, a device well known in a functional sense in the telephony arts. The object is to allow selected connection between any of a given number, in this case six, electrical transmission lines. FIG. 6 shows a crosspoint switch 60 for interconnecting any of lines 1, 2, or 3 with lines *a*, *b*, or *c*. The switch is physically similar to the device of FIG. 3 and the details need not be repeated. There are three channels 61, 62, and 63 extending along the upper surface of the slice and three orthogonal channels 64, 65, and 66 extending along the obverse side of the slice as shown. These channels are linear charge coupled lines of the structure referred to previously except that they do not require the lateral transfer elements or the terminal transfer sections from one side of the slice to the other. In this device the transfer through the slice is made selectively. For example, if line 2 is to be connected to line "*c*," then the control network 68 biases transfer electrode 2*c*, causing the charge from line 2 on the top surface of the slice to be continuously injected to channel 66 on the other side of the slice for the duration of the bias on electrode 2*c*. It is evident how any other such selection can be made. The details of the charge transfer along channels 61 to 66 and the charge transfer drive elements have been omitted for clarity. However, the operation and function of these elements is known from the prior art and from the foregoing discussion.

Thus it is evident that the concept of translating charge along both sides of, and selectively through, a wafer storage medium allows unusual versatility in the design and performance of charge coupled devices.

Figure 7:
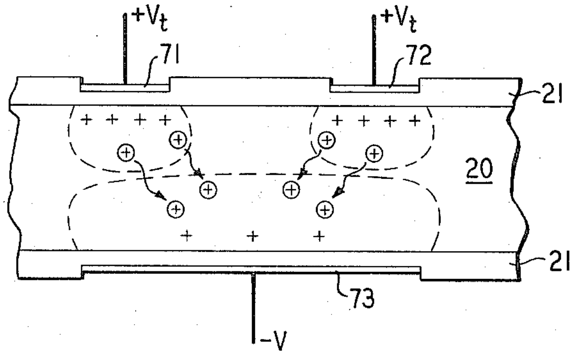
FIG. 7 is a sectional view of a logic device illustrating one approach to performing a fan-in logic function using the principles of the invention.

Other ways of extending this concept to various forms of logic, memory, and digital signal processing circuits will occur readily to those skilled in the art. For example, the application of the three dimensional charge coupled concept can be applied to the performance of a fan-in function as part of a logic operation. An embodiment of this is represented schematically in FIG. 7. Electrodes 71 and 72 represent the terminal stages of their respective charge coupled lines which are to be combined. If these sites are forward biased by $+V_t$ as discussed previously while the receiving site on the opposite side of the slice is reverse biased with the ordinary storage bias $-V$ (or larger to increase the charge transfer efficiency and decrease the charge transit time), the charge in the respective channels will be combined adjacent electrode 73 for subsequent processing and/or readout.

Various additional modifications and extensions of this invention will become apparent to those skilled in the art. All such variations and deviations which basically rely on the teachings through which this invention has advanced the art are properly considered with the spirit and scope of this invention.

What is claimed is:

1. A charge coupled apparatus comprising a thin charge storage medium, an insulating layer covering both major sides of the charge storage medium, a series of serially arranged drive electrodes on each insulating layer for forming at least one charge coupled information channel beneath each insulating layer, electrical terminal means for applying sequential drive voltages to each series of drive electrodes whereby charge storage sites can be formed in the medium and charge can be sequentially transferred between storage sites along the channels, and electrical terminal means for biasing at least one selected pair of electrodes, one on each side of the storage medium, whereby charge at a storage site in one channel can be transferred through and within the charge storage medium to a storage site in a channel on the other side of the charge storage medium.

2. The device of claim 1 in which the storage medium is silicon.

3. A charge coupled shift register comprising a thin charge storage medium, an insulating layer covering both major sides of said charge storage medium, a plurality of essentially parallel series of serially arranged drive electrodes on each insulating layer, each series forming a charge coupled information channel in the charge storage medium, means interconnecting, in a direction essentially orthogonal to the information channels, drive electrodes from each series of the plurality, electrical terminal means for applying sequential drive voltages to the interconnected drive electrodes whereby charge storage sites can be formed simultaneously in each information channel and charge can be transferred sequentially between storage sites in each channel, and electrical terminal means for biasing selected pairs of electrodes, the electrodes of each pair located on opposite sides of the charge storage medium and approximately aligned through the thickness of the medium, whereby charge at storage sites in the information channels on one side of the medium can be transferred through and within the charge storage medium to information channels on the other side of the charge storage medium.

4. The shift register of claim 3 with means for translating charge laterally between parallel channels on at least one side of the medium.

5. The shift register of claim 3 in which the channels on opposite sides of the storage medium are offset with respect to each other.

6. The shift register of claim 3 in which the channels on opposite sides are aligned with respect to each other.

7. The shift register of claim 3 in which the storage medium is silicon.

8. The shift register of claim 7 in which the insulating layer is silicon dioxide.

9. The shift register of claim 3 in which the electrode strips extend in a direction orthogonal to the channels.

10. A charge coupled switching device for interconnecting one or more of a plurality of incoming information channels with one or more of a plurality of outgoing information channels comprising a thin charge storage medium, an insulating layer covering both major sides of the charge storage medium, a plurality of essentially parallel series of drive electrodes on each insulating layer, each series forming a charge coupled information channel in the charge storage medium with the plurality of series on one layer extending in a direction different from that of the plurality of series on the other layer so that as viewed through the thickness of the charge storage medium the information channels intersect, electrical terminal means for applying sequential drive voltages to each series of drive electrodes whereby charge storage sites can be formed in the medium and charge can be transferred between storage sites along the channels, and electrical terminal means for biasing selected pairs of electrodes located at the points of intersection of the information channels so that charge at a storage site in one channel can be transferred through and within the charge storage medium to a storage site in a channel on the other side of the charge storage medium.

* * * * *